United States Patent
Kasprzyk et al.

(10) Patent No.: US 8,235,064 B2
(45) Date of Patent: Aug. 7, 2012

(54) SINGLE COIL REDUNDANT VALVE

(75) Inventors: Donald J. Kasprzyk, Maple Grove, MN (US); James Edward Erickson, Eagan, MN (US)

(73) Assignee: Honeywell International Inc., Morristown, NJ (US)

( * ) Notice: Subject to any disclaimer, the term of this patent is extended or adjusted under 35 U.S.C. 154(b) by 433 days.

(21) Appl. No.: 12/437,881

(22) Filed: May 8, 2009

(65) Prior Publication Data

US 2010/0282988 A1 Nov. 11, 2010

(51) Int. Cl.
*F16K 1/20* (2006.01)
(52) U.S. Cl. .......... 137/1; 137/614.11; 137/66; 137/613
(58) Field of Classification Search .............. 137/66, 137/613, 614.11, 1, 594, 595; 251/129.02, 251/129.03, 129.15, 26; 335/265
See application file for complete search history.

(56) References Cited

U.S. PATENT DOCUMENTS

| | | | |
|---|---|---|---|
| 2,297,854 A * | 10/1942 | Alfery | 137/66 |
| 3,472,277 A | 10/1969 | Reinicke et al. | |
| 3,784,154 A * | 1/1974 | Ostrowski et al. | 251/38 |
| 4,268,009 A | 5/1981 | Allen, Jr. | |
| 4,543,974 A * | 10/1985 | Dietiker et al. | 137/66 |
| 4,790,352 A * | 12/1988 | Dietiker et al. | 137/613 |
| 4,921,011 A | 5/1990 | Kelly et al. | |
| 5,413,141 A * | 5/1995 | Dietiker | 251/26 |
| 5,447,287 A | 9/1995 | Kelly et al. | |
| 5,904,333 A * | 5/1999 | Kelly et al. | 251/28 |
| 6,047,718 A | 4/2000 | Konsky et al. | |
| 6,263,908 B1 * | 7/2001 | Love et al. | 137/613 |
| 6,672,326 B2 * | 1/2004 | Pappalardo et al. | 137/66 |
| 6,786,225 B1 * | 9/2004 | Stark et al. | 137/1 |
| 6,899,118 B1 | 5/2005 | Pumm et al. | |
| 2010/0108927 A1 * | 5/2010 | Perz et al. | 251/129.15 |

* cited by examiner

*Primary Examiner* — Kevin Lee
*Assistant Examiner* — Craig J Price
(74) *Attorney, Agent, or Firm* — Seager Tufte & Wickhem LLC

(57) ABSTRACT

A single magnetic coil floating plunger redundant gas valves is disclosed. In an illustrative embodiment, the valve may include a first plunger tube, a second plunger tube spaced a distance from the first plunger tube, a magnetic coil disposed about at least part of the first plunger tube, a first plunger disposed within the first plunger tube, and a second plunger disposed within the second plunger tube. The first and second plungers may be operatively coupled to first and second valve members. Activation of the magnetic coil may result in the first and second plungers being suspended in the plunger tubes without a hard mechanical plunger stop to selectively open corresponding valves or other actuatable components, as desired.

20 Claims, 4 Drawing Sheets

SINGLE COIL REDUNDANT VALVE

TECHNICAL FIELD

The present invention relates generally to valves, and more particularly, to electromagnetic activated valve assemblies.

BACKGROUND

Valves are commonly used in conjunction with many appliances for regulating the flow of fluid or gas. For example, gas valves are often incorporated into gas-fired appliances to regulate the flow of gas to a combustion chamber or burner. Examples of such gas-fired appliances can include, but are not limited to, water heaters, furnaces, boilers, fireplace inserts, stoves, ovens, clothes dryers, grills, deep fryers, or any other such device where gas control is desired. In such gas-fired appliances, the gas may be ignited by a pilot flame, electronic ignition source, or other ignition source, causing combustion of the gas at the burner element producing heat for the appliance. In many cases, a gas valve either permits gas to flow, or ceases to permit gas to flow in response to a control signal from a control device such as a thermostat or other controller. In some applications, redundant gas valves are desired for increased safety.

SUMMARY

The present invention generally relates to valves, and more particularly, to electromagnetic activated valve assemblies. In one illustrative embodiment, a single coil redundant valve includes a first plunger tube and a second plunger tube, each formed at least in part from a substantially non-magnetic-flux-conducting material and having at least one open end. A substantially non-magnetic-flux-conducting material is one that does not substantially conduct magnetic flux, but rather allows magnetic flux to pass through the material in a substantially unencumbered manner. In some cases, a magnetic coil may extend around at least part of the first plunger tube. A first plunger and a second plunger, formed at least in part from a magnetic-flux-conducting material, may be slidably disposed within the first plunger tube and the second plunger tube, respectively. The first plunger may have a top end and a bottom end, with the bottom end oriented toward an open end of the first plunger tube. Likewise, the second plunger may have a top end and a bottom end, with the bottom end oriented toward an open end of the second plunger tube.

In some cases, a first flux plate, formed at least in part from a magnetic-flux-conducting material, may extend between the first plunger tube and the second plunger tube. In some cases, the first flux plate may be positioned adjacent to, but above, the top end of the first plunger and the top end of the second plunger when the first plunger and second plunger are in their second positions. Likewise, a second flux plate, formed at least in part from a magnetic-flux-conducting material, may be spaced from the first flux plate and may extend between the first plunger tube and the second plunger tube. The second flux plate may, for example, be positioned adjacent to, but above, the bottom end of the first plunger and the bottom end of the second plunger when the first plunger and second plunger are in their second positions.

Activation of the magnetic coil may move the first and second plungers from a second position toward a first position. In some cases, activation of the magnetic coil causes a magnetic flux loop that extends: from the first plunger, through the first plunger tube, and to the first flux plate; from the first flux plate, through the second plunger tube, and to the second plunger; from the second plunger, through the second plunger tube, and to the second flux plate; and from the second flux plate, through the first plunger tube, and back to the first plunger. It is contemplated that the first and second plunger tubes may be free from a hard mechanical stop adjacent the top end of the first and second plungers when the first and second plungers are in the first position. The illustrative valve may further include a first valve member operatively coupled to the bottom end of the first plunger, and a second valve member operatively coupled to the bottom end of the second plunger. In some cases, a first bias element may be provided for biasing the first plunger toward its second position, and a second bias element may be provided for biasing the second plunger toward its second position.

The preceding summary is provided to facilitate an understanding of some of the innovative features unique to the present invention and is not intended to be a full description. A full appreciation of the invention can be gained by taking the entire specification, claims, drawings, and abstract as a whole.

BRIEF DESCRIPTION OF THE DRAWINGS

The invention may be more completely understood in consideration of the following detailed description of various embodiments in connection with the accompanying drawings, in which.

Figure 1:
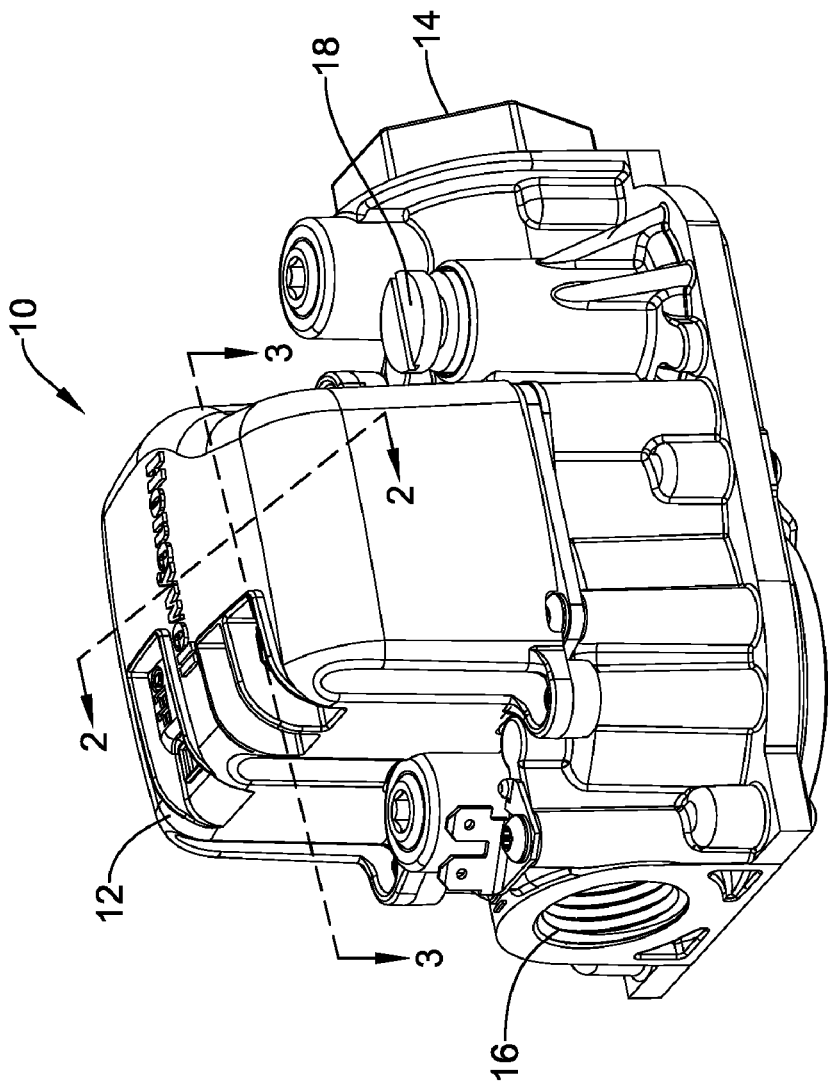
FIG. 1 is a perspective view of an illustrative single coil redundant valve.

While the invention is amenable to various modifications and alternative forms, specifics thereof have been shown by way of example in the drawings and will be described in detail. It should be understood, however, that the intention is not to limit aspects of the invention to the particular embodiments described. On the contrary, the intention is to cover all modifications, equivalents, and alternatives falling within the spirit and scope of the invention.

DETAILED DESCRIPTION

The following description should be read with reference to the drawings wherein like reference numerals indicate like elements throughout the several views. The detailed description and drawings show several embodiments which are meant to illustrative of the claimed invention.

Gas valves often incorporate some form of redundancy to help improve the safe operation of the gas valves. This redundancy can take the form of two actuatable gas valves that are connected in series. When so provided, both of the gas valves must be opened before gas can flow to an associated appliance. In some cases, each of the gas valves includes a solenoid plunger that is actuated by a corresponding magnetic coil. When activated, the magnetic coil may produce a magnetic field that pulls the plunger, and thus the gas valve, towards the open position.

In many cases, a hard mechanical stop is provided to stop each of the gas valves at the open position. Such hard mechanical stops can cause acoustical and electrical noise when the plunger hits the stop during opening of the valve. Also, and in some cases, the hard mechanical stops can create direct metal-to-metal contact between a plunger and the stop, which can cause debris to be generated and released into the gas valve through repeated actuation of the gas valve. Residual magnetism may also be generated between the hard mechanical stop and the plunger, which may cause the valve to "stick" open after the magnetic coil is deactivated, which can reduce the reliability of the gas valve. Hard mechanical stops can also represent an additional cost during the manufacture of the gas valve. What would be desirable, therefore, is a relatively simple redundant gas valve, which in some cases, does not require such hard mechanical stops.

FIG. 1 is a perspective view of an illustrative single coil redundant valve 10. The illustrative gas valve 10 may have a housing 12 formed from a non-magnetic material such as, but not limited to, aluminum, plastic or any other suitable material. The valve 10 may have a gas inlet 14 and a gas outlet 16, each configured to be coupled to a conduit, as is known in the art. The gas valve 10 may further include a regulator 18 for adjusting the rate of gas flow through the valve 10. The regulator 18 may include any suitable regulator assembly, as desired.

Figure 2:
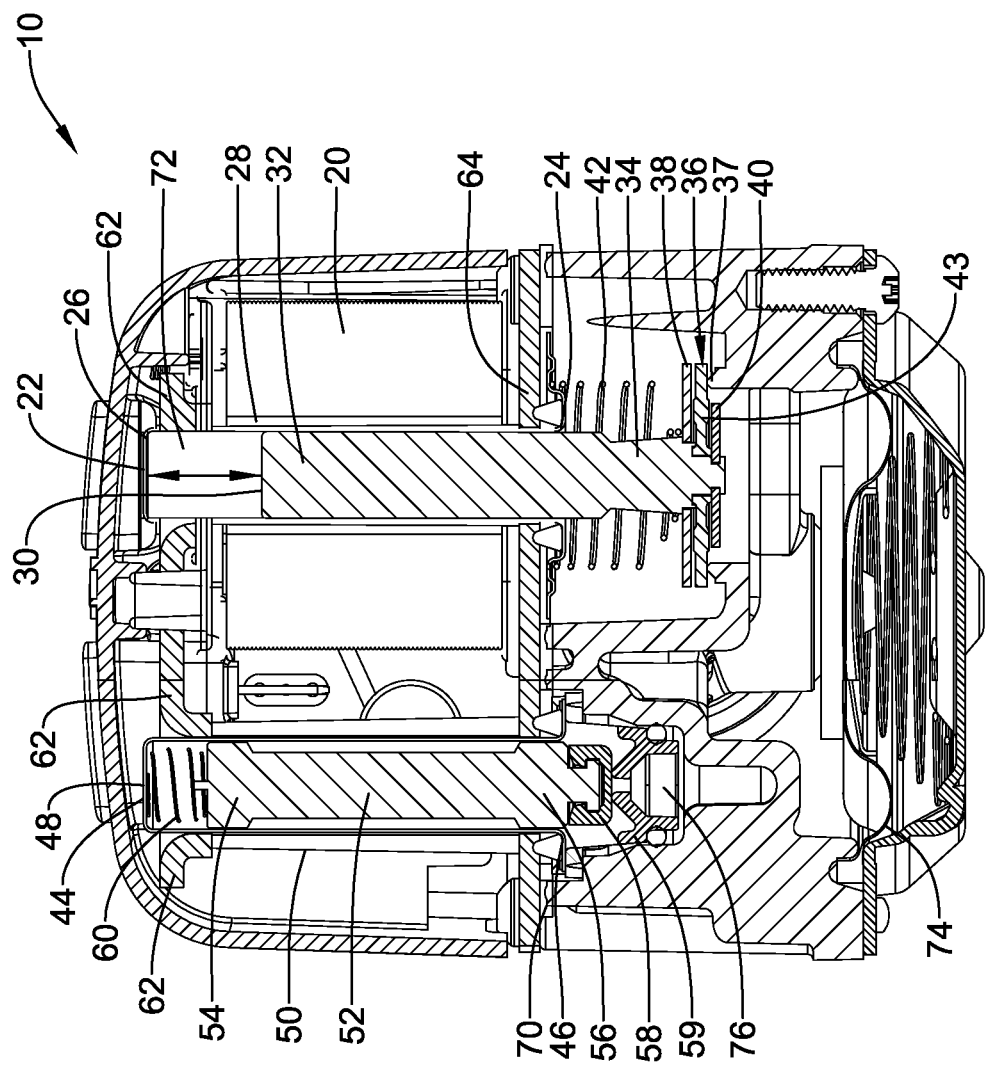
FIG. 2 is a cross-section of the illustrative single coil redundant valve of FIG. 1 taken along line 2-2.

FIG. 2 is a cross-section of the illustrative single coil redundant valve of FIG. 1 taken along line 2-2. In the illustrative embodiment, the gas valve 10 includes a single magnetic coil 20 disposed about at least part of a first plunger tube 22. However, in some embodiments, a second magnetic coil may be disposed about a second plunger tube 44. The single magnetic coil 20 may be generally annular in shape forming a central aperture having a first central axis. Activation of the magnetic coil 20 using, for example, AC or DC current, may result in the production of a magnetic field. The first plunger tube 22 may be disposed within the central aperture of the magnetic coil 20. First plunger tube 22 may, in some cases, be made from or include a substantially non-magnetic-flux-conducting material such as, but not limited to, stainless steel, plastic or any other suitable material. A substantially non-magnetic-flux-conducting material is one that does not substantially conduct magnetic flux, but rather allows magnetic flux to pass through the material in a substantially unencumbered manner. In some cases, the magnetic coil 20 may be spaced a distance from the first plunger tube 22 by a bobbin 28. The bobbin 28 may be disposed within the central aperture of the magnetic coil 20 and about the first plunger tube 22. The bobbin 28 may also be formed from a substantially non-magnetic-flux-conducting material, such as, but not limited to, plastic.

The illustrative first plunger tube 22 has an open bottom end 24 and a closed top end 26. In some cases, the top end 26 is not closed. If the top end 26 is not closed, a manual on-off stop may be added to prevent gas from leaking out of the plunger tube. The manual on-off stop may comprise, for example, an o-ring or other sealing mechanism. A first plunger 30 is shown slidably or movably disposed within the first plunger tube 22 and along the first central axis of the magnetic coil 20. The first plunger 30 may be made from or include a magnetic-flux-conducting material such as, but not limited to, ferromagnetic materials, steel, iron, nickel, cobalt or any other suitable magnetic-flux-conducting material, as desired. The first plunger 30 may have a top end 32 oriented toward the closed end 26 of the first plunger tube 22, and a bottom end 34 oriented toward the open end 24 of the first plunger tube 22. The bottom end 34 of the first plunger 30 may be operatively coupled to a first valve member 36. The terms "top" and "bottom" refer to the particular orientation of gas valve 10 in the Figures, but is should be understood that these are only relative terms.

The first valve member 36 may include rigid disks 38, 40 disposed on a top side and a bottom side, respectively, of a sealing disk 43. The sealing disk 43 may be made from or include silicone, rubber or any other suitable sealing material, as desired. In the illustrative embodiment, disk 40 may not extend the entire width of the sealing disk 43 so that the sealing disk 43 may engage a first valve seat 37 when the first valve member 36 is in the closed position. The first valve seat 37 may be a part of the valve housing 12 or may be a separate component, as desired.

In some cases, a biasing element 42 may be disposed about the bottom end 34 of the first plunger 30, as shown. The biasing element 42 may include a spring, or any other suitable element that may bias the first plunger 30 toward the closed position. In FIG. 2, biasing element 42 biases the first plunger 30 in a generally downward direction such that a gap 72 exists between the closed end 26 of the first plunger tube 22 and the top end 32 of the first plunger 30. When the first plunger 30 is in a generally downward position, as described above, the first plunger 30 may be said to be in the second position (e.g. closed position). As shown, the biasing element 42 may be generally disposed between the open end 24 of the first plunger tube 22 and the top rigid disk 38 of the first valve member 36. First valve member 36 may sealingly engage or seat against the first valve seat 37 when the first plunger 30 is in the second position, resulting in the first valve member 36 being in the closed position.

The illustrative gas valve 10 further includes a second plunger tube 44 having a second central axis. The second plunger tube 44 may be laterally offset and spaced a distance from the first plunger tube 22, as shown. Like the first plunger tube 22, the second plunger tube 44 may be made from or include a non-magnetic-flux-conducting material such as, but not limited to, stainless steel, plastic or any other suitable material. A substantially non-magnetic-flux-conducting material is one that does not substantially conduct magnetic flux, but rather allows magnetic flux to pass through the material in a substantially unencumbered manner. The second plunger tube 44 may be surrounded by a spacer 50. The spacer 50 may be made from or include a substantially non-magnetic-flux-conducting material, such as, but not limited to, plastic. In the illustrative embodiment, the second plunger tube 44 has an open bottom end 46 and a closed top end 48. However, the top end 48 need not necessarily be closed, as desired. A second plunger 52 is shown slidably or movably disposed within the second plunger tube 44 along the second axis. The second plunger 52 may be made from or include a magnetic-flux-conducting material such as, but not limited to, ferromagnetic materials, steel, iron, nickel, cobalt or any other suitable magnetic-flux-conducting material, as desired. The second plunger 52 may have a top end 54 oriented toward the closed end 48 of the second plunger tube 44 and a bottom end 56 oriented toward the open end 46 of the second plunger tube 44. The bottom end 56 of the second plunger 52 may be operatively coupled to a second valve member 58. The terms "top" and "bottom" refer to the particular orientation of gas valve 10 in the Figures, but is should be understood that these are only relative terms.

In the illustrative embodiment, a biasing element 60 may be disposed between the top end 54 of the second plunger 52 and the closed end 48 the second plunger tube 44. The biasing member 60 may include, for example, a spring or any other element that may bias the second plunger 52. As shown, biasing element 60 may bias the second plunger 52 in a generally downward position such that the top end 54 of the second plunger 52 is spaced a distance from the closed end 48 of the second plunger tube 44. When the second plunger 52 is in a generally downward position, as described above, the second plunger 52 may be said to be in a second position (e.g. closed position). When in the second position, the second valve member 58 may sealingly engage or seat against a second valve seat 59. The second valve seat 59 may be a part of the valve housing 12 or a separate component, as desired.

Illustrative gas valve 10 may further include a first flux plate 62 and a second flux plate 64. The first flux plate 62 may be formed at least in part from a magnetic-flux-conducting material such as, but not limited to, steel. The first flux plate 62 may extend between the first plunger tube 22 and the second plunger tube 44. This may be more clearly seen in FIG. 3. The first flux plate 62 may be positioned adjacent to, but above, the top end 32 of the first plunger 30 and the top end 54 the second plunger 52 when the first plunger 30 and the second plunger 52 are in their second positions (e.g. closed positions).

Likewise, the second flux plate 64 may be formed at least in part from a magnetic-flux-conducting material such as, but not limited to, steel. The second flux plate 64 may be positioned adjacent to, but above, the bottom end 34 of the first plunger 30 and the bottom end 56 of the second plunger 52 when the first plunger 30 and the second plunger 52 are in their second positions (e.g. closed positions). When the first plunger 30 and the second plunger 52 are in their second positions, first and second valve members 36, 58 may be in their closed positions which may result in the gas valve 10 being closed, therefore preventing the flow of gas through the valve 10.

Figure 4:
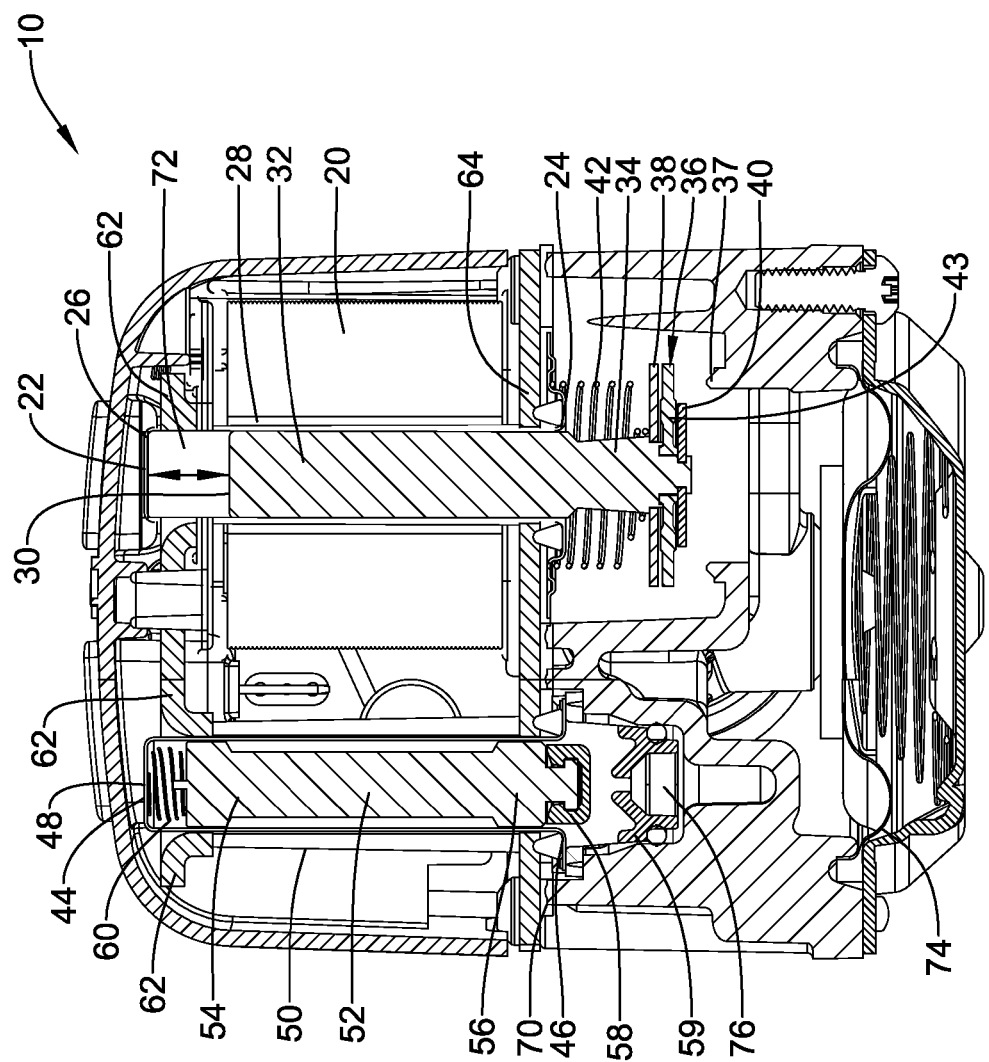
FIG. 4 is another cross-section of the illustrative single coil redundant valve of FIG. 1.

Referring now to FIG. 4, activation of the magnetic coil 20 may result in the generation of a magnetic field flux. The magnetic flux may extend from the magnetic coil 20 through the first plunger tube 22 (substantially un-attenuated) to the first plunger 30. The magnetic flux may cause the first plunger 32 to move toward the closed end 26 of the first plunger tube 22 against the force of biasing element 42, causing the first valve member 36 to open and the gap 72 to become smaller. When the first plunger 30 is moved towards the closed end 26 of the first plunger tube 22, the first plunger 30 may be said to be in a suspended or first position (e.g. open position). When the first plunger 30 is in the first position, the first biasing element 42 may compress allowing the first valve member 36 to move away from the first valve seat 37 to open the first valve member 36.

The magnetic flux generated by the magnetic coil 20 may extend from the first plunger 30 through the first plunger tube 22 (substantially un-attenuated) to the first flux plate 62. The magnetic flux may then travel through the first flux plate 62 through the second plunger tube 44 (substantially un-attenuated) to the second plunger 52. The magnetic flux may move the second plunger 52 toward the closed end 48 of the second plunger tube 44 against the force of biasing element 60, causing the second valve member 58 to open. When the second plunger 52 is moved towards the closed and 48 of the second plunger tube 44, the second plunger 52 may be said to be in a suspended or first position (e.g. open position). When the second plunger 52 is in the first position, the second valve member 58 may be in an open position. When the second valve member 58 is in the open position, actuation of the main valve diaphragm actuator 76 may occur. This may result in actuation of the main valve diaphragm 74, permitting the flow of gas through the gas valve 10.

The magnetic flux may then extend from the second plunger 52 through the second plunger tube 44 (substantially un-attenuated) to the second flux plate 64. The magnetic flux may then travel along the second flux plate 64 through the first plunger tube 22 (substantially un-attenuated) to the first plunger 30, creating a magnetic flux loop. As long as the magnetic coil 20 remains activated, the plungers 30, 52 may remain floating or suspended in their first or activated positions within their corresponding plunger tubes 22, 44, allowing the valve 10 to remain open to gas flow.

As can be seen, when the first and second plungers 30, 52 are in their first position (e.g. open position), the plunger tubes 30, 44 may not have a hard mechanical stop positioned within the plunger tubes 30, 52 to halt the motion of the plungers 30, 52 or to transfer the magnetic flux. When the magnetic coil 20 is no longer activated, the magnetic flux loop ceases to exist, and the first and second plungers 30, 52 return to their second or un-activated positions under a return bias force provided by bias elements 42 and 60. This may return the first and second valve members 36, 58 to their closed positions, therefore preventing the flow of gas through the valve 10.

Figure 3:
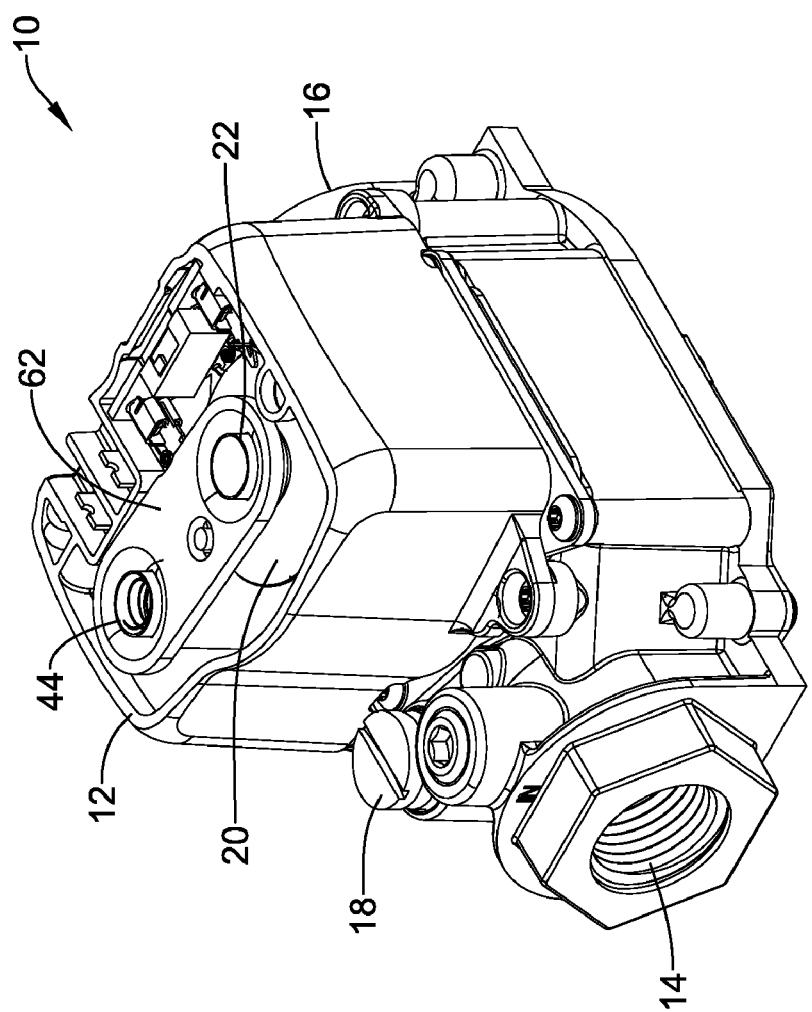
FIG. 3 is a partial cross-sectional perspective view of the illustrative single coil redundant valve of FIG. 1 taken along line 3-3.

Turning now to FIG. 3, which is a partial cross-sectional perspective view of the illustrative single coil redundant valve of FIG. 1 taken along line 3-3. As can be seen in FIG. 3, the gas valve 10 has the magnetic coil 20 disposed about the first plunger tube 22. The second plunger tube 44 is laterally offset and spaced a distance from the first plunger tube 22. The first flux plate 62 extends between the first and second plunger tubes 22, 44. The first flux plate 62 may be positioned above the first and second plungers (not shown), especially when the first and second plungers are in the second position (e.g. closed position).

Those skilled in the art will recognize that the present invention may be manifested in a variety of forms other than the specific embodiments described and contemplated herein. Accordingly, departure in form and detail may be made without departing from the scope and spirit of the present invention as described in the appended claims.

What is claimed is:

1. A single coil redundant valve, comprising:
   a first plunger tube formed at least in part from a substantially non-magnetic, flux conducting material and having an open end;
   a second plunger tube formed at least in part from a substantially non-magnetic, flux conducting material and having an open end, wherein the second plunger tube is laterally offset and spaced from the first plunger tube;
   a magnetic coil extending around at least part of the first plunger tube;
   a first plunger formed at least in part from a magnetic-flux-conducting material, the first plunger having a top end and a bottom end;
   the first plunger is slidably disposed within the first plunger tube with the bottom end of the first plunger oriented toward the open end of the first plunger tube, wherein activation of the magnetic coil moves the first plunger from a second position toward a first position, wherein when the first plunger is in the first position, the top end of the first plunger does not engage a hard mechanical stop;
   a first valve member operatively coupled to the bottom end of the first plunger;
   a second plunger formed at least in part from a magnetic-flux-conducting material, the second plunger having a top end and a bottom end;
   the second plunger is slidably disposed within the second plunger tube with the bottom end of the second plunger oriented toward the open end of the second plunger tube, wherein activation of the magnetic coil moves the second plunger from a second position toward a first position, wherein when the second plunger is in the first position, the top end of the second plunger does not engage a hard mechanical stop;
a second valve member operatively coupled to the bottom end of the second plunger;
a first flux plate formed at least in part from a magnetic-flux-conducting material extending between the first plunger tube and the second plunger tube, wherein the first flux plate is positioned adjacent but extends above the top end of the first plunger and the top end of the second plunger when the first plunger and second plunger are in their second positions; and
a second flux plate formed at least in part from a magnetic-flux-conducting material extending between the first plunger tube and the second plunger tube, wherein the second flux plate is positioned adjacent but extends above the bottom end of the first plunger and the bottom end of the second plunger when the first plunger and second plunger are in their second positions.

2. The single coil redundant valve of claim 1 further comprising:
a first bias element for biasing the first plunger toward its second position;
a second bias element for biasing the second plunger toward its second position.

3. The single coil redundant valve of claim 2, wherein the first bias element is a spring that is situated between the second flux plate and the first valve member.

4. The single coil redundant valve of claim 2, wherein the second bias element is a spring that is situated between the top end of the second plunger and a top end of the second plunger tube.

5. The single coil redundant valve of claim 2, wherein the first valve member is in a closed position when the first plunger is in its second position, and the second valve member is in a closed position when the second plunger is in its second position.

6. The single coil redundant valve of claim 5, wherein the first valve member is in an open position when the first plunger is in its first position, and the second valve member is in an open position when the second plunger is in its first position.

7. The single coil redundant valve of claim 5, wherein in the closed position, the first valve member is seated against a first valve seat, wherein the first valve seat is part of a valve housing.

8. The single coil redundant valve of claim 7, wherein in the closed position, the second valve member is seated against a second valve seat, wherein the second valve seat is part of the valve housing.

9. The single coil redundant valve of claim 1, wherein the first valve member and the second valve member form part of gas valves.

10. The single coil redundant valve of claim 1, wherein activation of the magnetic coil causes a magnetic flux loop that extends:
from the first plunger, through the first plunger tube, and to the first flux plate;
from the first flux plate, through the second plunger tube, and to the second plunger;
from the second plunger, through the second plunger tube, and to the second flux plate; and
from the second flux plate, through the first plunger tube, and back to the first plunger.

11. A single coil redundant valve, comprising:
a magnetic coil forming an aperture having an axis;
a first plunger movable disposed within the aperture of the magnetic coil, the first plunger is formed at least in part from a magnetic-flux-conducting material and is movable along the axis of the aperture by activation of the magnetic coil;
a first valve member operatively coupled to the first plunger;
a second plunger laterally offset and spaced from the first plunger, the second plunger is formed at least in part from a magnetic-flux-conducting material and is movable along a second plunger axis by activation of the magnetic coil;
a second valve member operatively coupled to the second plunger;
a first flux plate formed at least in part from a magnetic-flux-conducting material extending from adjacent a first end of the first plunger to adjacent a first end of the second plunger;
a second flux plate formed at least in part from a magnetic-flux-conducting material extending from adjacent a second end of the first plunger to adjacent a second end of the second plunger; and
wherein, when activated, the magnetic coil produces a magnetic field that moves the first plunger along the axis of the aperture of the magnetic coil to an activated position, wherein in the activated position, the first plunger is suspended and does not engage any hard mechanical stop.

12. The single coil redundant valve of claim 11, wherein, when activated, the magnetic coil produces a magnetic field that, through the first and second flux plates, moves the second plunger along the second plunger axis to an activated position, wherein in the activated position, the second plunger is suspended and does not engage any hard mechanical stop.

13. The single coil redundant valve of claim 11 further comprising:
a first bias element for biasing the first plunger away from the activated position;
a second bias element for biasing the second plunger away from the activated position.

14. The single coil redundant valve of claim 13, wherein the first valve member corresponds to a first valve that is in an open position when the first plunger is in its activated position.

15. The single coil redundant valve of claim 14, wherein the second valve member corresponds to a second valve that is in an open position when the second plunger is in its activated position.

16. A method for operating a gas valve, comprising:
activating a magnetic coil to produce a magnetic field that moves a first plunger from an un-activated position to an activated position, and further moves a second plunger from an un-activated position to an activated position;
wherein the second plunger is laterally offset and spaced from the first plunger, and wherein, while activating the magnetic coil, the first plunger is suspended by the magnetic field and moves to the activated position without engaging any hard mechanical stop.

17. The method of claim 16 wherein, while activating the magnetic coil, the second plunger is suspended by the magnetic field and moves to the activated position without engaging any hard mechanical stop.

18. The method of claim 16 further comprising:
biasing the first plunger toward the un-activated position; and
biasing the second plunger toward the un-activated position.

19. The method of claim 16 further comprising:
opening a first gas valve as a result of moving the first plunger to the activated position; and
opening a second gas valve as a result of moving the second plunger to the activated position.

20. The method of claim 16 wherein the first gas valve and the second gas valve are fluidly connected in series.

* * * * *